May 9, 1939.　　　　　A. MADLE　　　　　2,157,267
POWER TRANSMISSION CONTROL
Filed April 7, 1937　　　4 Sheets-Sheet 1
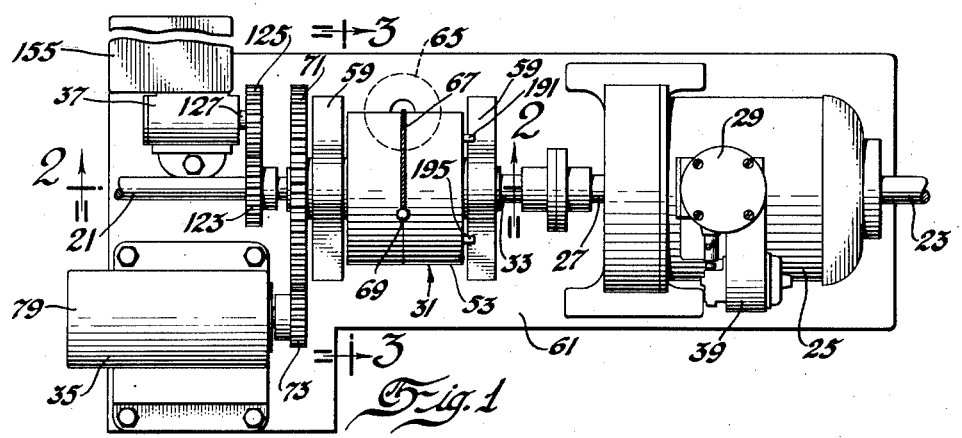
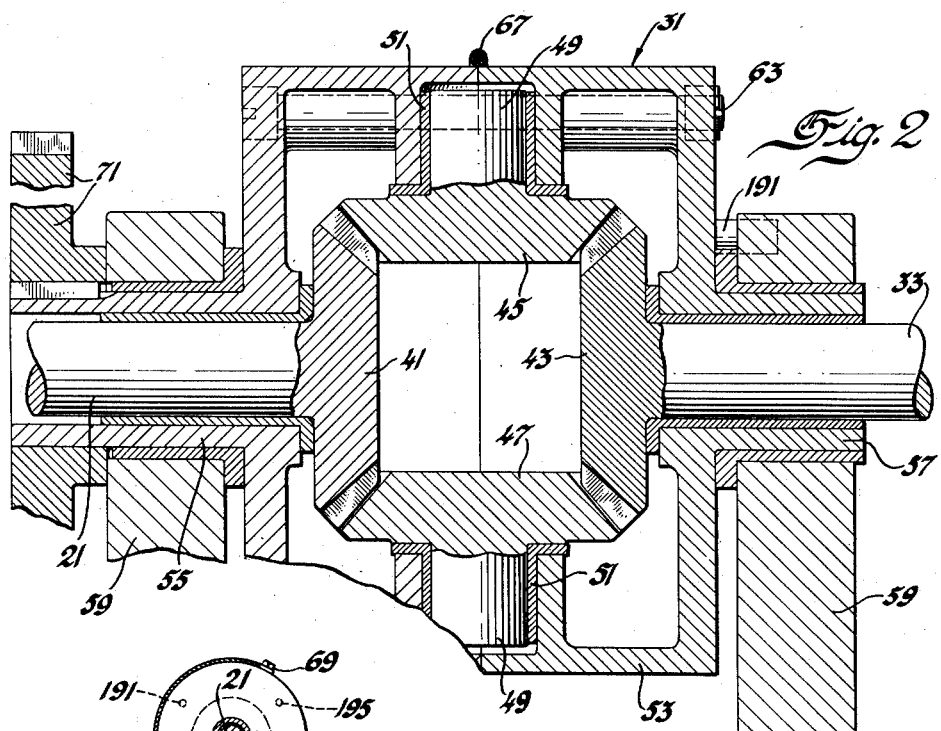
Inventor
Alain Madle
By Blackmore, Spencer & Hurd
Attorneys

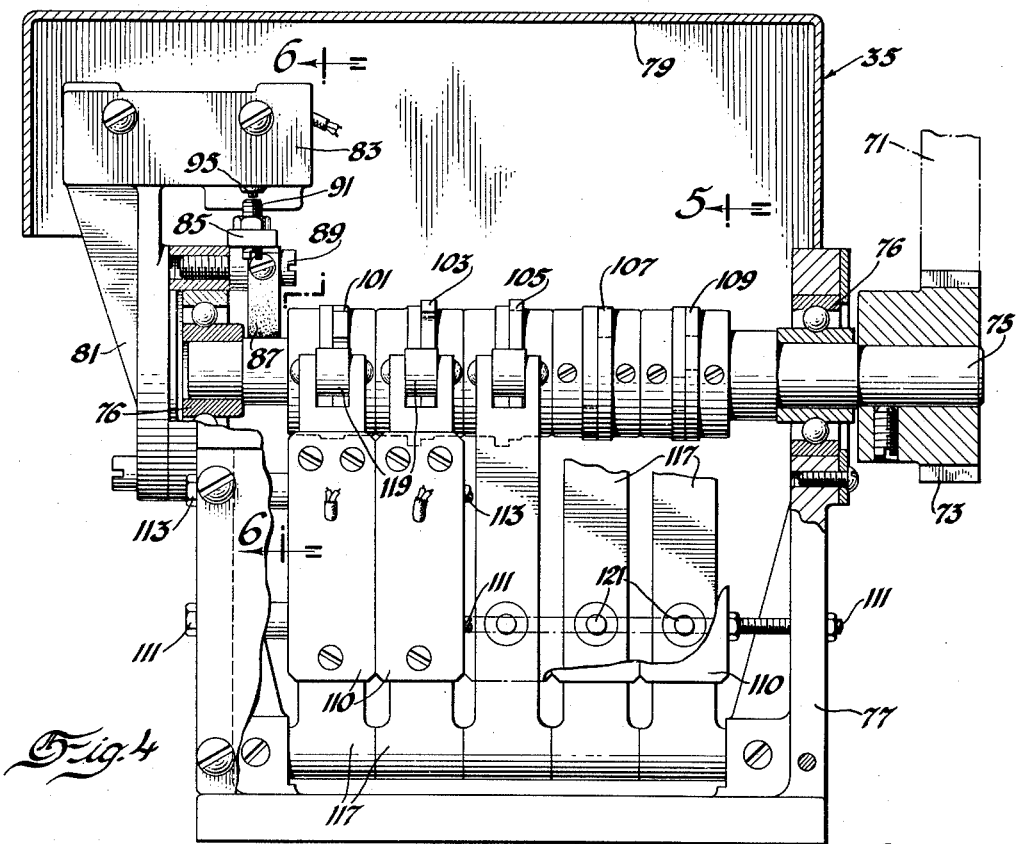
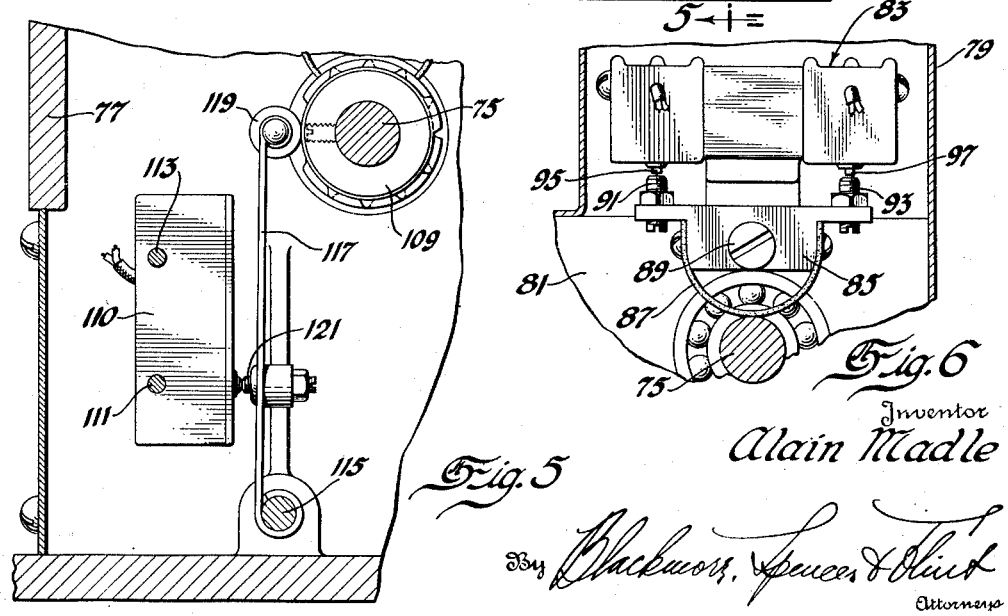

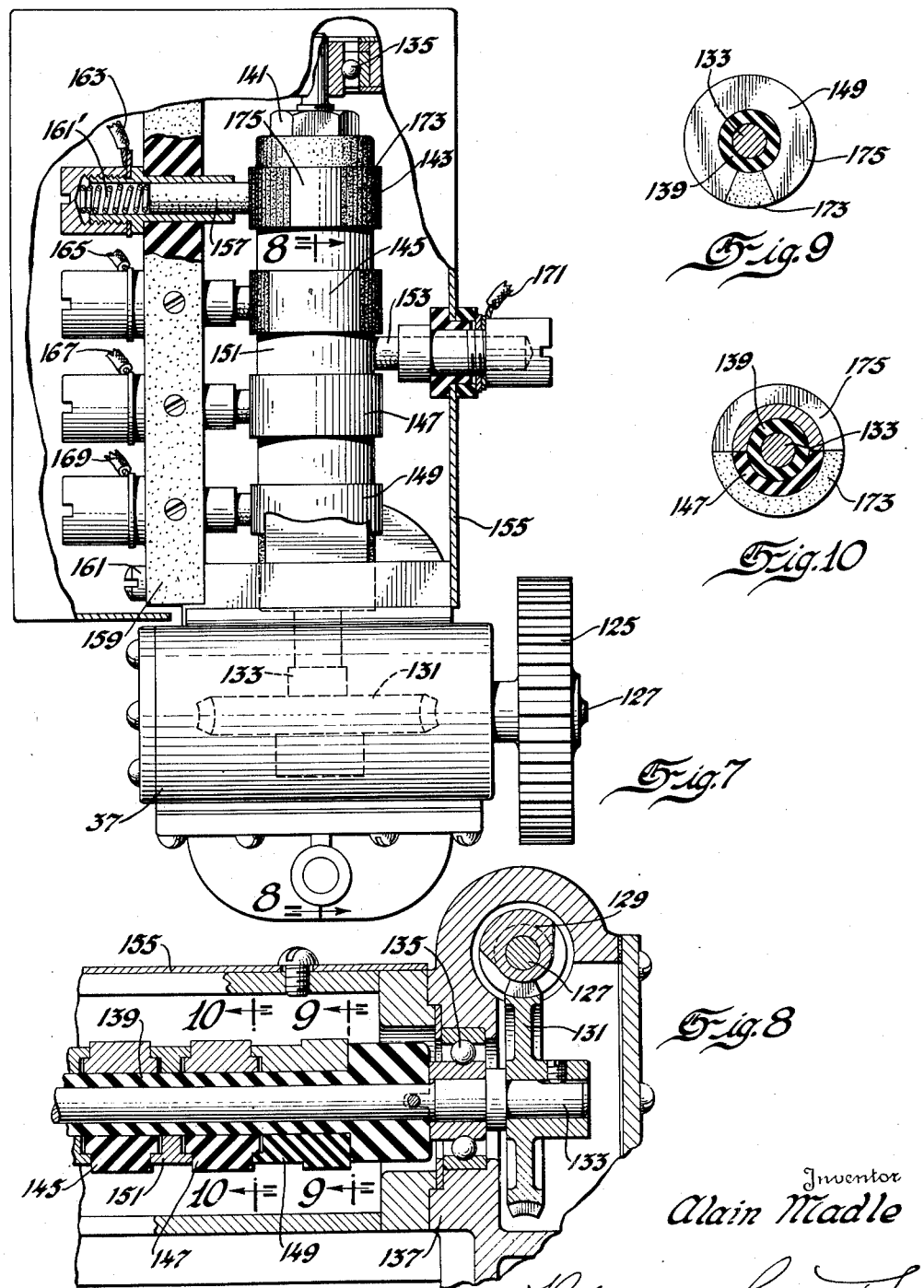

Patented May 9, 1939

2,157,267

UNITED STATES PATENT OFFICE 2,157,267

POWER TRANSMISSION CONTROL

Alain Madlé, Bristol, Conn., assignor to General Motors Corporation, Detroit, Mich., a corporation of Delaware Application April 7, 1937, Serial No. 135,360

7 Claims. (Cl. 74—259)

This invention relates to power transmission and is intended more particularly for industrial uses in controlling mechanism operating at variable speeds from a constant speed source, the output speed being automatically varied to accommodate load changes. It has utility when used for driving machines for winding strip, wire, fabric or paper functioning to automatically maintain a constant tension in the material being wound or coiled.

The control shown is intended for use where there is employed a constant speed input shaft and more particularly where the constant input speed is obtained from an electric motor, the electric energy being also used, through the instrumentality of suitable devices, to effect the necessary ratio changes in the transmission mechanism.

The device is intended for use with machines where material is being wound upon a drum or the like and where, incorporated in such machines, there is provision to feed the material at a constant linear velocity to the drum. It will be obvious that as the radial thickness of the material on the drum increases, the drum should be rotated more slowly in order to wind thereon given lengths in a given time. In other words, a given rate of feed of material requires changes in the rate of rotation of the winding drum to insure constant tension. It may be otherwise expressed by saying that the power necessary for the winding is a product of the tension and the linear velocity. If the latter is constant there must be a constant power flow to the drum to maintain constant tension. Since the input speed is constant, the constant power is provided by the mechanism of this invention whereby the rotation of the output shaft is automatically reduced as the load increases due to equal lengths of material being wound at radially greater distances.

The invention is illustrated by the accompanying drawings. In the drawings, Figure 1 is a diagrammatic plan view of an embodiment of the invention.

Figure 2 is a longitudinal section on line 2—2 of Figure 1.

Figure 3 is a transverse section on line 3—3 of Figure 1.

Figure 4 is a view in elevation partly broken away and in section of one part of the device.

Figure 5 is a view as seen from line 5—5 of Figure 4.

Figure 6 is a view as seen from line 6—6 of Figure 4.

Figure 7 is a top plan view partly broken away and in section of another part of the device.

Figure 8 is a section on line 8—8 of Figure 7.

Figure 9 is a sectional view on line 9—9 of Figure 8.

Figure 10 is a sectional view on line 10—10 of Figure 8.

Figure 11:
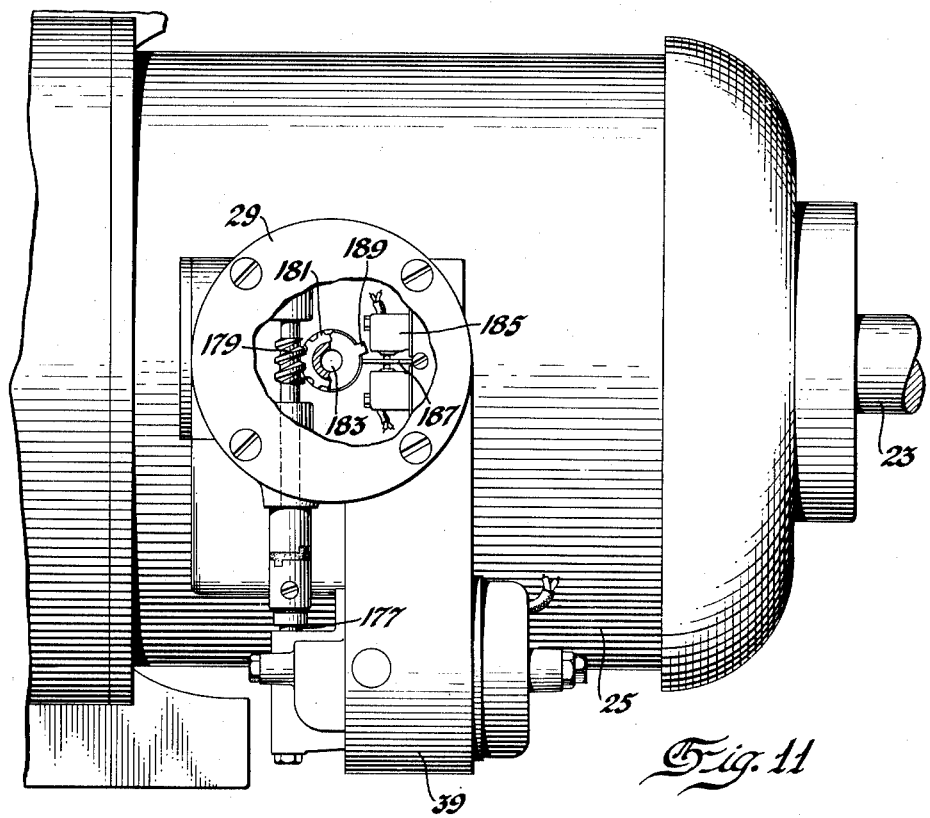
Figure 11 is a top plan view of the change speed transmission associated with a control therefor.

Referring by reference characters to the drawings, numeral 21 represents an input shaft, the shaft which is being driven at constant speed by an electric motor. The output shaft is marked 23. Since the shaft 23 may be subjected to various loads, as explained above, it is desirable that its rate of rotation be varied. To effect such variation in the rate of rotation of shaft 23, there is employed a change speed transmission mechanism marked 25. This transmission mechanism may be of the kind known as "Transitorq". The input shaft of the transmission mechanism is marked 27. At 29 is a housing for the mechanism controlling the ratio between the input and output shafts of the transmission mechanism. No novelty is claimed for this control mechanism in this application and no further description is therefore being given.

Between shafts 21 and 27 is a differential unit designated by numeral 31. Its output shaft 33 is directly connected to shaft 27 as shown. Its input shaft may be connected to, or, as shown, it may be integral with input shaft 21. At 35 is shown what I have seen fit to call a gang switch assembly and at 37 is a commutator assembly. These parts 35 and 37 serve to control the action of an electric current from a suitable source upon a pilot motor 39 operable to change the ratio of the transmission mechanism.

In Figure 2 is shown the differential unit on a larger scale. On the adjacent ends of shaft 21 and 33 are opposed pinions 41 and 43 meshing with pinions 45 and 47 carried on trunnion extensions 49. These trunnions are rotatable in bearings 51 of a reaction cage 53. Cage 53 has hollow end bearings 55 and 57 rotatably supported in fixed arms 59 mounted on a suitable base 61. The cage 53 may be formed from two similar parts assembled together and secured by bolts 63. The bearing members 55 and 57 rotatably support the shafts 21 and 33. The output torque tends to turn the reaction member clockwise as seen in Figure 3. A weight 65 is connected by a cable 67 to an anchorage 69 on the reaction member. This weight tends to rotate the reaction member in an opposite direction and constitutes a metering or balancing torque. After a balance is established between the output torque and the pull of the weight upon the reaction member, further rotation of the reaction member may occur as the effect of changes in the output load. These subsequent rotations of the reaction member are made use of to accommodate those load changes by changing the transmission ratio and this is accomplished through the instrumentality of accessory parts of the device as will be explained.

Bearing trunnion 55 of the reaction member carries secured thereto a gear 71 in driving engagement with a gear 73 on shaft 75 of the gang switch assembly 35. This shaft 75 is supported in bearings 76 in a supporting structure 77 provided with a cover 79. To the structure 77 adjacent the end of shaft 75 remote from the gear 73 is secured a supporting bracket 81 carrying switch mechanism marked 83. Associated with the switch mechanism is a rocking member 85 provided with an arcuate portion 87 adapted to be rocked in one direction or the other as a result of its frictional engagement with shaft 75. The rocking movement is about a pivotal center 89 carried by the support 81. The rocking member 85 has terminals 91 and 93 adapted to engage contacts 95 or 97 and close a circuit in one direction or the other, depending upon which contact member is engaged, through the pilot motor 39 which is of the reversible type. The reversal from one to the other of the switches occurs as shaft 75 rocks through a neutral position. Also on shaft 75 are a plurality of pairs of cams, five pairs being shown. These pairs of cams are marked 101, 103, 105, 107, 109. Adjacent these pairs of cams and below the same are switch boxes 110, suitably secured as by bolts 111 and 113 to the structure 77. Near the bottom of the structure 77 is a rod 115 upon which are the eyes of a plurality of arms 117 terminating in rollers 119 adapted to engage the respective cams. The arms 117 have contact members 121 to engage cooperating contacts of the several switches. The several cams have high spots circumferentially spaced so that one after another, the cams engage the rollers and rock the arms to make contact with the switches. The cams of each pair are oppositely arranged so that the several switches are closed in sequence irrespective of the direction of rotation of the shaft.

The input shaft 21 carries a gear 123 engaging a gear 125 on shaft 127 of the commutator assembly 37. Shaft 127 carries a worm 129 driving a worm gear 131 on shaft 133. Shaft 133 is supported in bearings 135 in a suitable supporting structure 137. Shaft 133 between the bearings is encircled by an insulating sleeve 139. This sleeve has an enlarged end engaging one bearing 135 as shown in Figure 8. At its other end it is positioned by a nut 141. A plurality of commutator rings 143, 145, 147, 149 are assembled axially upon the sleeve 139. Between rings 145 and 147 is a metallic ring 151. The several rings are in metallic contact end to end.

A brush of any preferred kind is marked 153. It is mounted in a housing or cover 155 and engages ring 151. Other brushes of which 157 is an illustrative example are mounted in a suitable holder 159 secured by fastening means 161. Preferably, each of these brushes is actuated by a spring 161' tending to resiliently hold the brush against its respective ring. Wires 163, 165, 167, 169 and 171 extend from these brushes. It will be observed that the surface of each ring includes an insulating part 173 and a metallic arcuate part 175, the latter adapted for electrical contact with its brush and, by means of the wire, to the switch associated with one of the arms 117. The lengths of the metallic arcs on the commutator rings vary. It will be seen that the metallic part of the circumference of ring 143 is relatively small, and that the length of the metallic parts progressively increase from ring 143 to ring 149.

The pilot motor 39 is a reversible motor and rotates a worm shaft 177 in either direction. Its worm 179 engages a gear 181 on a spindle 183 rotatable to change the ratio of the transmission mechanism. To prevent the parts of the control mechanism being jammed, there may be used limiting switches 185 actuated by projecting element 187 engaged by a lug 189 rotating with shaft 183.

Figure 12:
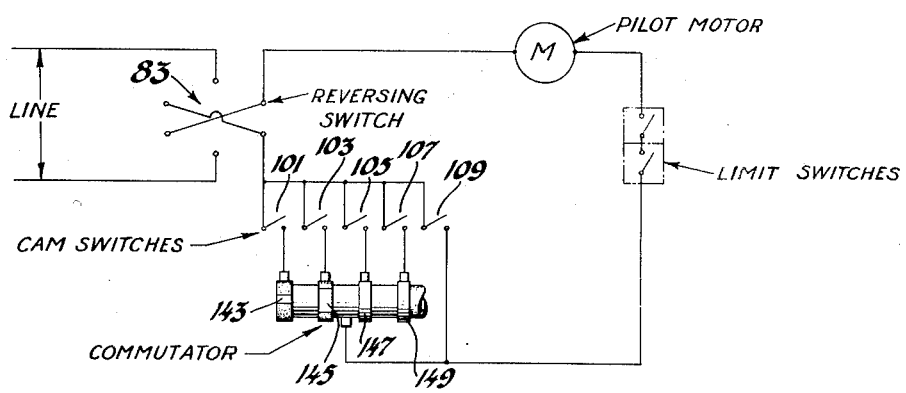
Figure 12 is a diagrammatic view to illustrate the operation of the mechanism illustrated in the other figures.

The operation will perhaps be best understood by reference to Figure 12. The source of electrical energy may be at the end of the figure marked "Line". The circuit includes the switch designated by numeral 83 on Figure 4, and marked in this figure "Reversing switch," inasmuch as the switch mechanism 83 determines the direction of current through the pilot motor. The circuit also includes the cam actuated switches and the commutator rings, the limiting switches corresponding to 185 in Figure 11 and the pilot motor, the latter coupled to the control for the transmission mechanism as shown in Figure 11. It should be explained that there is a normal position of rest for the reaction member 53. While the device is operating, the reaction member maintains this normal position of rest only when there is no change in the output load. This position of rest holds, by means of the gearing shaft 75 of the gang switch assembly in a predetermined position, a position in which the several switches are then open as shown by Figure 12. Changes in the load rock the reaction member and it, in turn, rocks shaft 75. This actuates switch 83 to bias the direction of current flow through the pilot motor. The extent of rotation of shaft 75 closes one or more of the cam actuated switches 110 and consequently determines which one of the commutator rings becomes effective in closing the circuit. In other words, it determines the length of commutator arc through which the circuit is closed during each rotation of the commutator shaft 133. The effect in the case of overload is to reduce the transmission ratio until the output torque again balances the metering torque. If the overload is considerable, the commutator rings progressively operate, as from ring 147 through ring 145 and ring 143 so that the balance between output torque and metering torque is obtained smoothly and without any hunting action. If, instead of increasing, the output load decreases, the reverse direction of current is obtained by a reverse direction of rotation of shaft 75. Also, in this case, the extent of rotation of shaft 75 determines which of the commutator rings begins the restoring action.

When the device is not operating, the weight 65, unbalanced by output torque, rotates the reaction member until a pin 191 carried by the reaction member engages the supporting pedestal as at 193. In so doing, the shaft 75 is rocked far enough to cause cam 109 to close its switch, this switch being operable directly and without the interposition of any one of the mutilated commutator rings. The pilot motor then shifts the ratio to higher speed. When shaft 21 again is driven, the load torque on the output shaft in the manner described, reduces the ratio and restores the balance with the metering torque. Thereafter, occasional fluctuations are corrected in the manner described above. Lest excessive overload rotate the reaction member beyond the position for most effective restoration, that is beyond the point where switch 109 is operated, a stop 195 is provided on the reaction member to engage the pedestal when the reaction member rotates in a clockwise direction, as will be seen from Figure 3.

I claim:

1. In combination, an input shaft, an output shaft, ratio changing mechanism between said shafts, a reaction member also located between said shafts, electrical means actuated by a rotation of said reaction member in response to changes in load on the output shaft to change the ratio afforded by the ratio changing mechanism, said electrical means including a source of energy, a reversing switch and cam operated switches, said switches adapted to be closed by the rotation of said reaction member, a commutator assembly having commutator rings in series with said switches, said commutator rings having contact surfaces of unequal length, a motor influenced by said source of energy and controlled by said switches and commutator rings.

2. In combination, an input shaft, a differential unit, a change speed mechanism for a control device, said differential unit having normally balanced reaction member, a gang switch assembly including a shaft driven by the reaction member, a current direction switch, a plurality of cam switches adapted to be closed by rotation of said shaft, a commutator assembly having a shaft, a plurality of mutilated commutator rings on said shaft, a source of energy and a pilot motor in series with said switches and rings and operable upon said control device.

3. The invention defined by claim 2, said commutator shaft being in driving engagement with the input shaft.

4. In combination, an input shaft, a differential unit having a reaction member, a change speed mechanism, a control device therefor, a motor to operate said control device, a gang switch assembly geared to said reaction member, a commutator assembly geared to said input shaft and a source of electrical energy operable upon said pilot motor in response to the joint action of said commutator assembly and said gang switch assembly.

5. The invention defined by claim 4, said gang switch assembly including a current reversing switch and a plurality of cam operated switches.

6. The invention defined by claim 4, said gang switch assembly including a current reversing switch and a plurality of cam operated switches, and said commutator assembly having a plurality of mutilated commutator rings associated respectively with the cam operated switches.

7. The invention defined by claim 4 together with a weight operable upon said reaction member to balance a predetermined output torque.

ALAIN MADLÉ.